(12) United States Patent
Payen (10) Patent No.: US 10,542,842 B2
(45) Date of Patent: Jan. 28, 2020

(54) FOOD COOKING APPLIANCE COMPRISING A STIRRING BLADE

(75) Inventor: Jean-Marc Payen, Quetigny (FR)

(73) Assignee: SEB S.A., Ecully (FR)

( * ) Notice: Subject to any disclaimer, the term of this patent is extended or adjusted under 35 U.S.C. 154(b) by 1273 days.

(21) Appl. No.: 13/993,732

(22) PCT Filed: Dec. 15, 2011

(86) PCT No.: PCT/FR2011/053010
§ 371 (c)(1),
(2), (4) Date: Aug. 26, 2013

(87) PCT Pub. No.: WO2012/080674
PCT Pub. Date: Jun. 21, 2012

(65) Prior Publication Data
US 2014/0000462 A1   Jan. 2, 2014

(30) Foreign Application Priority Data

Dec. 17, 2010 (FR) .................................... 10 60732

(51) Int. Cl.
*A47J 43/046* (2006.01)
*A47J 37/10* (2006.01)
*A47J 36/16* (2006.01)
*A47J 43/07* (2006.01)

(52) U.S. Cl.
CPC ........... *A47J 37/108* (2013.01); *A47J 36/165* (2013.01); *A47J 43/046* (2013.01); *A47J 43/0716* (2013.01)

(58) Field of Classification Search
CPC .... A47J 36/165; A47J 43/046; A47J 43/0733; A47J 43/0716

USPC ................... 99/348, 422, 409; 366/309, 312, 366/242–252
See application file for complete search history.

(56) References Cited

U.S. PATENT DOCUMENTS

| 7,461,589 B2 * | 12/2008 | Sinton .................... A47J 27/004 219/428 |
| 7,993,694 B2 | 8/2011 | Goderiaux et al. |
| 8,618,447 B2 * | 12/2013 | De' Longhi ........ A47J 37/1209 126/376.1 |
| 2004/0065211 A1 * | 4/2004 | McNair ................. A47J 27/004 99/348 |
| 2008/0271609 A1 * | 11/2008 | Pahl ...................... A47J 36/165 99/348 |

FOREIGN PATENT DOCUMENTS

| EP | 1969978 | * | 9/2008 | ............ A47J 36/165 |
| EP | 2248452 | * | 11/2010 | ............ A47J 36/165 |
| WO | 2007088279 A1 | | 8/2007 | |

\* cited by examiner

Primary Examiner — Reginald Alexander
(74) Attorney, Agent, or Firm — The Webb Law Firm (57) ABSTRACT

Provided is a food cooking appliance comprising: a bowl having a side wall; and a blade, the bowl and blade being designed to have a relative rotary movement about an axis of rotation. The blade includes a lifting means shaped so as to lift the food with which it comes into contact, and a means for pushing the food toward the lifting means. The appliance is characterized in that: the aforementioned side wall includes a widened section, the lifting means extends directly vertically above the widened section, and the respective projections of the lifting means and of the widened section overlap in a single plane parallel to the axis of rotation. The invention can be used in the field of cooking appliances.

25 Claims, 4 Drawing Sheets

FIG.9 even though the present description is focused on such a household appliance...

FOOD COOKING APPLIANCE COMPRISING A STIRRING BLADE

TECHNICAL FIELD

The present invention relates to the general technical field of food heating and cooking appliances, notably for home use, and in particular appliances for cooking food in the presence of fat.

The present invention more particularly relates to a food cooking appliance comprising, on the one hand, a bowl for containing said food and having a side wall, and on the other hand, a blade, said bowl and blade being designed so as to be animated by a relative rotational movement about an axis of rotation in order to stir the food in the bowl, said blade comprising, on the one hand, a lifting means configured so as to lift, under the effect of the relative rotational movement, the food with which it enters into contact, and on the other hand, a means for pushing back the food toward the lifting means, under the effect of the relative rotational movement.

PRIOR ART

A dry-cooking fryer is already known, which is provided with a vessel, a blade rotating within the vessel, as well as a hot air circuit for coating pieces of potato with a film of fat and cooking the thus-coated pieces of potato in a flow of hot air, in order to obtain French fries.

Such an appliance gives perfect satisfaction insofar as it makes it possible, in particular, to automatically obtain French fries with a very small quantity of fat. This known appliance may however be further optimized, in particular as regard its ability to obtain a good culinary result independently of the quantity of food to be cooked.

Indeed, the above-mentioned known appliance is designed to cook a relatively high predetermined quantity of food (1 kg or 1.5 kg, for example). In the case where the user wants to cook smaller quantities of food, in order for example to cook only a single portion of French fries (which may represent about 150-200 g of French fries), the stirring of the food might be not as homogeneous as it could be in the presence of a higher quantity of food.

Indeed, in the presence of a small quantity of food, a risk exists that the blade of the known appliance just pushes the food, without really stirring it homogeneously. The following drawbacks result therefrom:

the food is not automatically coated with oil in a perfectly homogeneous manner; and
the food is not uniformly cooked.

The result obtained may thus be disappointing with respect to what is obtained with the same appliance for a higher quantity of food, close to the recommended nominal quantity.

For the same reasons, this known appliance does not allow optimal making of some recipes needing to progressively incorporate ingredients in the bowl, insofar as the progressiveness of introduction of the ingredients into the bowl does not make it possible to immediately reach a sufficient volume of food for a fully efficient stirring.

SUMMARY OF THE INVENTION

The objects assigned to the invention are consequently to remedy the various drawbacks specified above and to propose a food cooking appliance capable of cooking variable quantities of food with the same homogeneity and uniformity.

Another object of the invention is to propose a novel food cooking appliance of particularly simple design.

Another object of the invention is to propose a novel food cooking appliance that is easy to make.

Another object of the invention is to propose a novel food cooking appliance that provides a particularly efficient stirring of the food, even when the latter is present in small quantity.

Another object of the invention is to propose a novel food cooking appliance that is particularly compact.

Another object of the invention is to propose a novel food cooking appliance that is particularly reliable.

Another object of the invention is to propose a novel food cooking appliance that is particularly inexpensive.

The objects given to the invention are achieved with the help of a food cooking appliance comprising, on the one hand, a bowl for containing said food and having a side wall, and on the other hand, a blade, said bowl and blade being designed so as to be animated by a relative rotational movement about an axis of rotation in order to stir the food in the bowl, said blade comprising, on the one hand, a lifting means configured so as to lift, under the effect of the relative rotational movement, the food with which it enters into contact, and on the other hand, a means for pushing back the food toward the lifting means, under the effect of the relative rotational movement, said appliance being characterized in that said side wall comprises at least one flared section, in that the lifting means extends at least in part plumb with the flared section so as to lift the food that is plumb with the flared section, and in that the respective projections of the lifting means and the flared section in a same plane parallel to the axis of rotation overlap each other at least in part.

BRIEF DESCRIPTION OF THE DRAWINGS

Other objects and advantages of the invention will appear more fully from the following description, with reference to the appended drawings, given only by way of illustrative and non-limitative examples, and in which.

BEST WAY TO IMPLEMENT THE INVENTION

The food cooking appliance 1 illustrated in the figures is preferably a household appliance, i.e. it is specifically designed and dimensioned for home use. Nevertheless, the invention is not restricted to a family context, and also relates to the semi-professional or professional appliances.

The appliance 1 illustrated in the figures is preferentially intended for cooking particulate elements, that are in the form of solid or semi-solid pieces, and that are preferably substantially polyhedral in shape, such as potato pieces (for obtaining French fries, for example), or such as diced vegetables (for making pan-fried vegetables, for example). The appliance 1 is preferentially intended for cooking food in the presence of fat, but cooking without added external fat (other than that contained in the food itself), and even in the absence of any external cooking fluid, is within the scope of the invention. The appliance 1 illustrated in the figures is especially intended either for making French fries from potato pieces, or for making pan-fried vegetables from diced vegetables. The potato or vegetable pieces may have been cut manually by the user, or bought ready-prepared in a shop, either in a fresh or frozen state (pre-cooked or not).

Nevertheless, the invention is not specifically limited to preparing French fries or pan-fried vegetables. Frying, sauteing, roasting, or more generally heating up any other type of food (including for example meat, fish, shellfish, vegetables and fruits) are within the scope of the invention.

Preferably, the appliance 1 according to the invention is a dry-cooking fryer similar to that described in the documents WO-2006/000699, WO-2006/000700 and WO-2007/088279, the content of which is incorporated by way of reference. As used herein, "dry cooking" means a mode of cooking food without immersing the latter in a bath of oil or fat, whether the immersion is temporary or permanent during the cooking cycle. The term "dry cooking" designates on the contrary a cooking mode in which the food is certainly "moistened" with a cooking medium (oil, for example), but without even so being plunged or dipped into said medium. In that, the principle of operation of a dry-cooking fryer is very clearly different from that of a conventional oil fryer. In the preferential case where the appliance 1 is a dry-cooking fryer, the bowl 2 and the blade 3 thereof (which will be more fully described hereinafter) thus form notably means for automatically coating the food with a film of fat, preferably substantially uniform and homogeneous, by stirring said food with fat. At the end of the dry-fry cooking process, essentially all the fat has been consumed (to coat the food), so that it remains essentially no more fat in the appliance.

The appliance 1 according to the invention comprises a bowl 2 for containing the food (not shown). The bowl 2 thus forms a receiving means designed to accommodate therein the food to be cooked. Preferably, the bowl 2 is also designed to accommodate and contain a cooking medium, for example in liquid or semi-liquid form, such as fat (oil, butter or the like). For that purpose, the bowl 2 is preferentially not perforated, i.e. it is substantially solid (unlike a basket) and liquid proof, so as to avoid any fat leaking out therefrom.

Preferably, the bowl 2 has substantially a rotational symmetry, about an axis of revolution X-X', said axis of revolution X-X' extending preferably vertically when the bowl 2 is in operative position.

As illustrated in the figures, the bowl 2 advantageously comprises a bottom 2A that is preferably substantially planar, and extends preferably substantially horizontally, i.e. substantially perpendicularly to the axis of revolution X-X'. As used herein, "substantially horizontally" means a bottom 2A that may extend either strictly horizontally, or following a profile close to the horizontal, for example slightly bulged toward the inside of the bowl 2, to limit or avoid deformations during the heating process. Advantageously, the bottom 2A has substantially a disk shape of radius R1, the axis of symmetry of said disk being advantageously merged with the axis of revolution X-X', as illustrated in the figures. The appliance 1 further comprises a side wall 2B, preferably substantially annular in shape. This side wall 2B advantageously rises from the bottom 2A (herein, at the periphery of the latter), between a lower edge connected to the bottom 2A and a free upper edge 2C delimiting an upper opening for introduction of the food into the bowl 2. The side wall 2B has therefore advantageously an annular shape, of axis of symmetry X-X'. Advantageously, the bowl 2 is a single-piece part, i.e. the side wall 2B is integral with the bottom 2A. For example, the bowl 2B is made by drawing a metal blank.

The appliance 1 according to the invention also comprises a blade 3 herein arranged within the bowl 2, i.e. advantageously mounted, preferably removably, in the internal volume defined by the bowl 2 and thus delimited by the bottom 2A and the side wall 2B. The bowl 2 and the blade 3 are thus designed so as to be animated by a relative rotational movement about an axis of rotation that preferably corresponds to the axis of revolution X-X', in order to stir the food in the bowl 2. The following configurations are thus fully in the scope of the invention:
  the bowl 2 is fixed, whereas the blade 3 rotates inside the bowl 2, relative to the latter;
  the blade 3 is fixed, whereas the bowl 2 rotates relative to the blade 3;
  the bowl 2 and the blade 3 both rotate, but at different rotational speeds and/or in two different directions of rotation.

Under the effect of the relative rotational movement, the food is thus set in motion within the bowl 2 by interacting with the blade 3, which leads to the stirring thereof within the bowl 2.

Advantageously, the appliance 1 comprises a main body 4 within which the bowl 2 is intended to be mounted, preferably removably.

Figure 1:
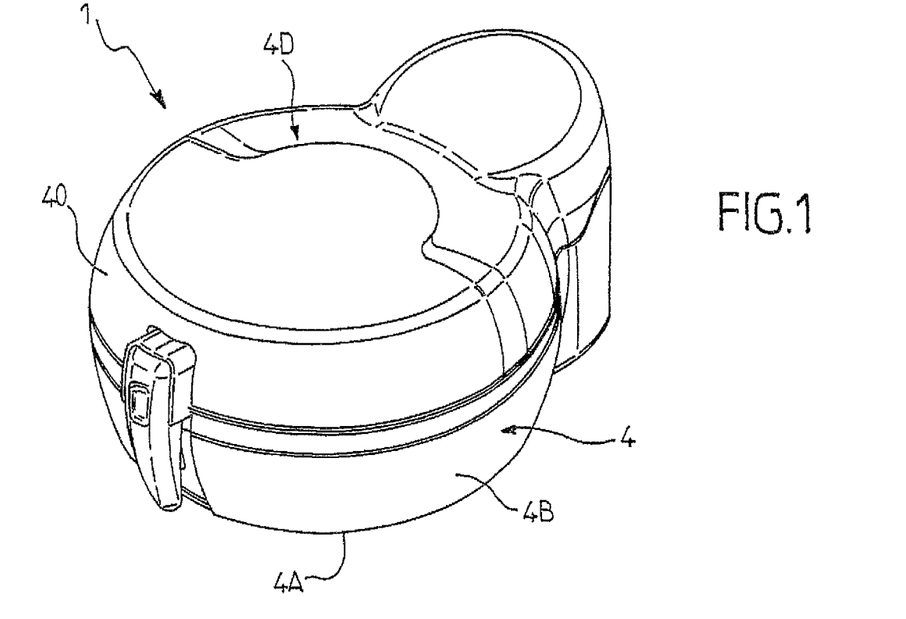
FIG. 1 illustrates, in a general perspective view, an exemplary food cooking appliance according to the invention.
Figure 2:
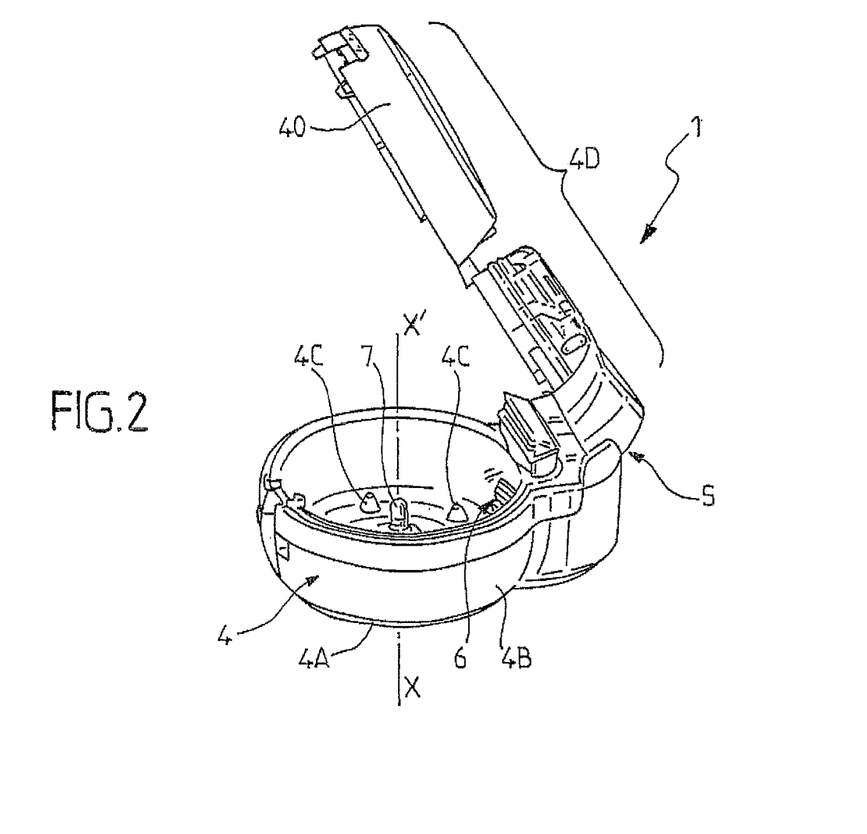
FIG. 2 illustrates, in an exploded view, the appliance of FIG. 1 without the bowl and blade thereof.
Figure 3:
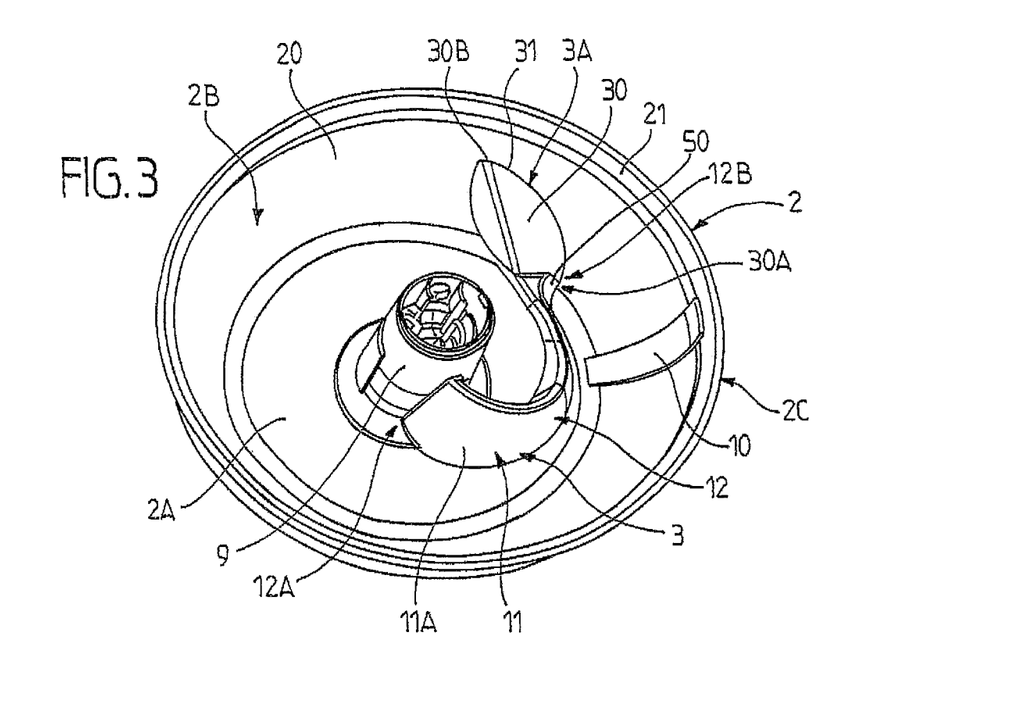
FIG. 3 illustrates, in a general perspective view, a bowl and a blade intended to be mounted in the appliance of FIGS. 1 and 2.

Preferentially, as illustrated in FIGS. 1 and 2, the main body 4 comprises a base 4A intended to form the pedestal of the appliance 1, and configured for that purpose so as to stably rest on a plane or a support. The base 4A thus defines a bearing side, intended to come into contact with said plane or support, and an opposite side for receiving the bowl 2, comprising for example supporting studs 4C protruding from the internal side of the base 4A, and on which the bowl 2 is intended to rest. From the base 4A and at the periphery of the latter rises a side skirt 4B, made for example of a metal or plastic material, and forming the external side envelop of the appliance 1. Advantageously, the main body 4 is also provided with a lid 4D mounted mobile between, on the one hand, a closing position (illustrated in FIG. 1) in which the lid 4 forms with the base 4A and the skirt 4B an enclosure substantially closed around the bowl 2, and on the other hand, an opening position (illustrated in FIG. 2) allowing the introduction of the food to be cooked within the main body 4, in the bowl 2. As illustrated in the figures, the lid 4D is advantageously mounted to pivot relative to the skirt 4B, for example via a hinge 5 preferentially provided with a torsion spring so that the opening position of the lid 4D is also a stable return position. Advantageously, the lid 4D comprises a transparent part 40 removably mounted on the rest of the lid 4D, in order to make it easier to clean.

The food contained in the bowl 2 can be heated up by any known internal heating means (i.e. integrated to the appliance 1) or external heating means (i.e. independent of the appliance 1). Advantageously, the appliance 1 comprises, mounted on the main body 4 and thus integrated to the appliance 1, a main heating means that is designed to generate a flow of hot air directed toward the inside of the bowl 2. The term "main heating means" designates a heating means that delivers alone at least the essential of the heat supply required for the cooking process to take place. Preferentially, the main heating means is designed and arranged so as to deliver the totality of said head supply. Preferably, the main heating means includes a fan generating a flow of air by sucking air into the main body 4 through at least one air inlet 6 (visible in FIG. 2), preferably formed on one side of the bowl 2, and by delivering said air, previously heated (for example by means of electric resistance heaters), through an internal guiding system that opens out toward and above the food present in the bowl 2. Such a forced hot-air flow heating circuit is described in detail in the document WO-2006/000700, the content of which is incorporated by way of reference. Of course, the invention is absolutely not limited to a particular heating mode, and it is in particular perfectly conceivable to perform the food heating and cooking processes by means of an infrared radiation heating, possibly combined with a forced air flow.

In the alternatives illustrated in the figures, which correspond to a preferential embodiment of the invention, the bowl 2 is fixedly mounted within the main body 4, whereas the blade 3 is rotatably mounted, preferably about the axis X-X', relative to the bowl 2 and to the main body 4. In other words, according to this preferential embodiment, the bowl 2 is fixed whereas the blade 3 rotates inside the bowl 2. Preferentially, in order for this relative movement of the bowl 2 and the blade 3 to be generated, a driving means (not visible), such as an electric motor, is arranged inside the base 4B. Said driving means rotationally drives a shaft 7 that protrudes vertically, coaxially to the axis X-X', of the base 4A. A corresponding orifice 8 is in this case arranged substantially at the center of the bottom 2A of the bowl 2, so as to permit the passage of the shaft 7 through the bottom 2A. The blade 3 comprises in this case a hub 9 intended to be fitted, preferably removable, on the shaft 7, so that the latter can therefore drive the blade 4 in rotation, about the axis X-X', inside the bowl 2, which remains advantageously fixed. In the embodiment illustrated in the figures, the hub 9 is arranged essentially coaxially to the axis of revolution X-X' of the bowl 2 and to the shaft 7.

The side wall 2B comprises at least one flared section 20 that extends advantageously (and herein directly) from the bottom 2A, at the periphery of the latter. As illustrated in the figures, the flared section 20 flares from the bottom 2A, i.e. it extends between a first edge 20A connected to the bottom 2A, whose radius corresponds substantially to the radius R1 of the disk forming the bottom 2A, and a second edge 20B, whose radius R2 is longer than the radius R1, taken into account the fact that the section 20 is flared, i.e. widens progressively upward from the bottom 2A. The above-mentioned second edge 20B of the flared section 20 can form the free edge 2C, which means in this case that the side wall 2B is substantially fully consisted by the flared section 20. Preferably, the second edge 20B in question is not a free edge, the side wall 2B comprising for example also an end section 21, for example essentially cylindrical in shape (i.e. with a substantially constant radius, whereas the radius of the flared section 20 increases progressively), which extends (or more precisely rises) from the flared section 20 (herein from the second edge 20B) up to the free edge 2C, which can be a rolled or folded edge. In the embodiment illustrated in the figures, the flared section 20 extends directly from the bottom 2A. However, it is perfectly conceivable, without thereby departing from the scope of the invention, that the flared section 20 does not extend directly from the bottom 2A. In this case, the side wall 2B could, for example, comprise a first cylindrical (tubular) section, that is substantially not flared and one end of which is connected to the bottom 2A whereas the other end is connected to the first edge 20A of the flared section 20.

Within the meaning of the invention, the flared section 20 forms, as illustrated in the figures, a portion of the side wall 2B, or even the integrality of the wall itself, and is thus distinct from the junction area, located at the interface between the side wall 2B (and preferably the flared section 20) and the bottom 2A, which ensures the connection of the side wall 2B (and preferably the flared section 20) to the bottom 2A. This junction area has a substantially insignificant height compared to the size of the bottom 2A and/or of the level (height) reached by the food in the bowl 2 during a normal use (i.e. with a quantity of food corresponding to at least about one portion). Advantageously, this junction between the bottom 2A and the side wall 2B (preferably the flared section 20) has itself a substantially regular curvature, i.e. the connection of the side wall 2B (preferably the flared section 20) to the bottom 2A is made progressively, without a sharp angle that could favor the catching of the food therein. Such a progressive connection is easily obtained within the framework of a method of manufacturing the bowl 2 by drawing a metal blank, for example. The blade 3 is advantageously above this junction area, and more precisely plumb with (at least locally) this junction area, at the normal of the latter (in the vertical direction materialized by the axis X-X').

Preferably, the flared section 20 extends, preferably from the bottom 2A, over at least a significant portion of the height H of the side wall 2B, said height H corresponding to the vertical distance (along the axis of revolution X-X') separating the bottom 2A from the free edge 2C. Advantageously, the flared section 20 thus extends from the bottom 2A over at least one third of the height H of the side wall 2B, and preferably over at least most of said height H of the side wall 2B. Moreover, in the preferential embodiment illustrated in the figures, the flared section 20 forms the essential of the side wall 2B.

As illustrated in the figures, the flared section 20 has advantageously a substantially curved shape, i.e. it has an arched, curved profile. Preferably, said flared section 20 has a radius of curvature R3, i.e. the flared section 20 has, in cross section (i.e. in a plane perpendicular to the bottom 2A and passing through the axis of revolution X-X'), a profile substantially in an arc of a circle of radius R3. It is however perfectly conceivable that the flared section 20 has not a curved shape with a radius of curvature, but a shape of a frustum of a cone, for example, or any other flared shape, it being understood that using a substantially concave shape (viewed from the inside of the bowl 2) is preferred.

Of course, the flare of the flared section 20 is relatively marked, in that the flared section does not have a slight draft facilitating the manufacturing of the bowl 2 (by a drawing or a molding process, for example) but a far greater draft, and in any case greater than the minimum draft required for the manufacturing of the bowl 2.

By way of variant, the following alternative configurations (non-exhaustive list), for example, can be conceived:
the flared section 20 is directly connected to the bottom and is formed of a cone-frustum-shaped surface substantially inclined by 45° with respect to the bottom 2A;

the flared section 20 is directly connected and is formed by the succession of a first cone-frustum-shaped surface substantially inclined by 30° with respect to the bottom 2A and a second cone-frustum-shaped surface substantially inclined by 60° with respect to the bottom 2A.

As illustrated in the figures, the blade 3 comprises a lifting means 3A configured so as to lift, under the effect of the relative rotational movement, the food with which it enters into contact. Accordingly, the lifting means 3A is designed to exert on the food a thrust effort with a vertical component (i.e., herein, parallel to the axis of revolution X-X'), said thrust effort with a vertical component being obtained preferably thanks to a particular configuration of the lifting means 3A that makes it possible to convert the relative rotational movement into a movement that lifts the food. As illustrated in the figures, the lifting means 3A is positioned substantially opposite the flared section 20, i.e. it is at the normal of said flared section 20, in front and in immediate proximity of the latter. More precisely, the lifting means 3A extends at least in part plumb with the flared section 20, so as to lift (under the effect of the above-mentioned relative rotational movement) the food present in the bowl 2 at the level of said flared section 20, and more precisely the food that is plumb with the flared section. Therefore, the lifting means 3A extends at least partially above (relative to the vertical direction herein materialized by the axis X-X') of the flared section 20, i.e. at least the peripheral lateral edge thereof (herein materialized by the upper external edge 31) extends at least in part plumb with the flared section 20. Preferably, the lifting means 3A extends plumb with the flared section 20 over at least substantially one third of the surface thereof facing the bowl 2. Further preferentially, the lifting means 3A extends substantially in the majority plumb with the flared section 20, i.e. only a minority, or even a nonexistent, fraction (in the case where the lifting means 3A extends substantially fully plumb with the flared section 20) of the lifting means 3A extends above the bottom 2A, whereas a majority fraction, or even substantially the totality, of the lifting means 3A extends above the flared section 20.

In other words, the projection of the lifting means 3A in a plane perpendicular to the axis of rotation of the blade 3 relative to the bowl 2 (i.e. a plane that is advantageously horizontal in the case where the axis of rotation in question is merged with the axis X-X' and where the latter is vertical) is merged at least in part (and preferably over at least substantially one third of the surface thereof, and further preferentially over at least most of the surface thereof) with the projection of the flared section 20 in this same plane.

Advantageously, and as illustrated in the figures, the lifting means 3A overhangs at least partially above the flared section 20. In this case, the lifting means 3A is inclined in such a way that the upper external edge 31 thereof is the part of the lifting means 3A that is the farthest of the axis X-X'. In other words, the side of the lifting means 3A that is located opposite the bowl 2 is inclined toward the outside of the bowl 2.

Moreover, as illustrated in the figures, the respective projections of the lifting means 3A and of the flared section 20 in a same plane parallel to the axis of rotation X-X' overlap each other at least in part. It thus exists at least one imaginary line that extends radially relative to the axis of rotation X-X', while crossing both the lifting means 3A and the flared section 20. In other words, the lifting means 3A and the flared section 20 both cross at least a same plane perpendicular to the axis of rotation X-X'. This means that the lifting means 3A at least partially faces the flared section 20 in the radial direction (with respect to the axis X-X'), which allows it, in combination with the fact that it extends at least in part plumb with said flared section 20 (i.e. above the latter in the vertical direction), to carry out a particularly efficient stirring of the food, for more or less important quantities of the latter.

Accordingly, as illustrated in the figures, the peripheral part (from the radial point of view) of the lifting means 3A extends at least in part above the flared section 20, whereas the lowest portion (low point 30a) of the lifting means 3A is located at a height (taken in the vertical direction materialized by the axis X-X') with respect to the bottom 2A that is lower than the height of the second edge 20B of the flared section 20.

The lower part of the lifting means is thus capable of interfering with a small quantity of food so as to lift it, whereas the upper part thereof allows higher quantities of food to be handled. Hence, the appliance 1 can operate satisfactorily not only for quantities of food corresponding to the nominal capacity of the appliance 1, but also with significantly reduced quantities.

Advantageously, the lifting means 3A is designed so as to ensure successively the lifting of the food in the area of the flared section 20, and the falling over thereof toward the center of the bowl 2. In the embodiment illustrated in the figures, the lifting means 3A, that belongs to the blade 3, thus sweeps, under the effect of the rotational movement of the blade 3, the flared section 20, lifting on its way the food it meets on its trajectory, and making advantageously fall over said food thus lifted toward the center of the bowl 2.

Advantageously, the lifting means 3A comprises an inclined face 30 designed so that the food slide above it under the effect of the relative rotational movement. In other words, the inclined face 30 forms a slope capable of lifting the food under the effect of the relative rotational movement, by a ramp effect. The surface of the inclined face 30 thus plays a role of a wedge that takes the food it meets on its trajectory off the wall of the bowl 2. The inclined face 30 advantageously extends between a low point 30A and a high point 30B, the vertical distance separating the low point 30A and the high point 30B corresponding to the height h1 of the lifting means 3A. This height h1 of the lifting means represents a significant fraction of the height h2 of the flared section 20, and represents preferably at least most of said height h2 of the flared section 20. The inclined face 3A is furthermore externally delimited by the upper external edge 31.

The lifting means 3A can thus sweep the flared section 20 over most of the height h2 of the latter, which contributes, in cooperation with the flared shape of the flared section 20, to an excellent stirring of the food, even when the latter is present in a small quantity.

In order to further optimize the stirring, by favoring the efficient sweeping of the internal surface of the bowl 2 by the blade 3, the latter (including the lifting means 3A) has advantageously a shape that substantially follows the internal contour of the bowl 2. The lifting means 3A thus advantageously conforms the shape of the flared section 20, i.e. it has a contour that is complementary of the profile of said flared section 20.

In order to further increase the efficiency of the stirring operated by the relative movement of the blade 3 and the bowl 2, the inclined face 30 of the lifting means 3A has advantageously a surface area that reduces rearward relative to the moving direction of the blade 3 with respect to the bowl 2, in order to favor the falling over toward the inside of the bowl 2 of the food sliding on and along said inclined face 30. In other words, the inclined face 30 gets narrower rearward, in order to first lift the food thanks to its inclined ramp shape, then to progressively slip away from the food, until making it falling over toward the inside.

Advantageously, the appliance 1 also comprises a protrusion 10 that protrudes from the side wall 2B toward the inside of the bowl 2, said protrusion 10 extending at least in part opposite the flared section 20, i.e. face to face with the latter, and being intended to enter into contact with at least a part of the food, so as to prevent the accumulation against the blade 3 of a block of food pieces that substantially do not move with respect to each other, and that are thus not stirred up. The protrusion 10 is advantageously mounted inside the appliance 1, preferably directly on the bowl 2, so that the blade 3 is mobile relative to the protrusion 10 under the effect of the relative rotational movement, said protrusion 10 being thus positioned so as to enter into contact with at least a part of the food.

In other words, the protrusion 10 forms an obstacle substantially placed on the trajectory of the food pushed by the blade 3, to prevent the food to wholly move as a compact block.

Figure 5:
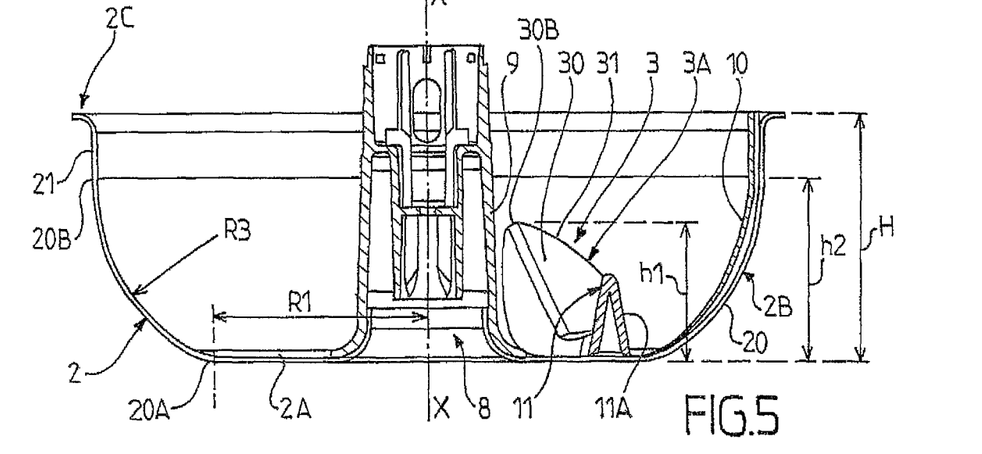
FIG. 5 illustrates, in a sectional view, the bowl/blade subset of FIGS. 3 and 4.
Figure 6:
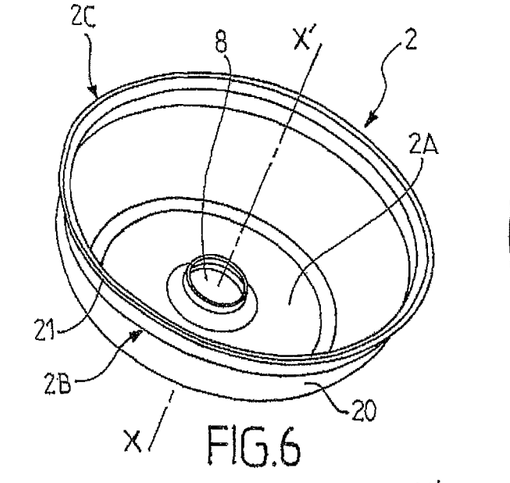
FIG. 6 illustrates, in a general perspective view, the bowl of FIGS. 3 to 5, taken alone.
Figure 7:
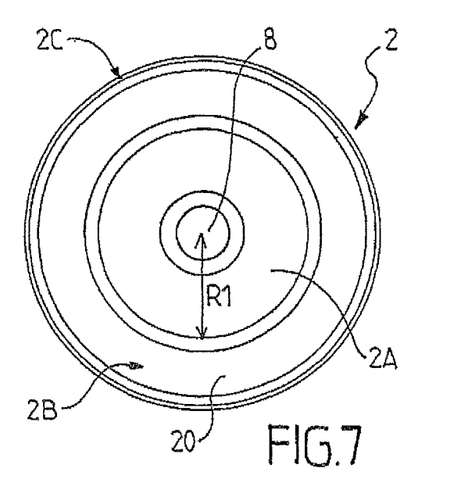
FIG. 7 illustrates, in a top view, the bowl of FIG. 6.
Figure 8:
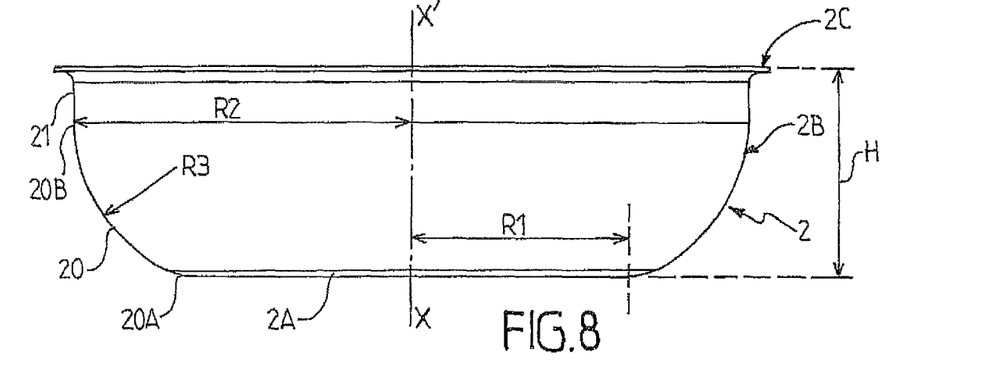
FIG. 8 illustrates, in a side view, the bowl of FIGS. 6 and 7.

Advantageously, the protrusion 10 has, as illustrated in the figures, a substantially elongated shape and extends, in a substantially vertical direction, over at least most of the height H of the side wall 2B. In particular, the protrusion 10 is advantageously in the form of a tab that extends vertically, conforming the contour of the inside of the bowl 2, substantially from the free edge 2C down to substantially the first edge 20A forming the interface of connection between the flared section 20 and the bottom 2A. Preferably, the thickness of the tab forming the protrusion 10 increases progressively from the bottom to the top, as can be seen in particular in FIG. 5. Of course, the lifting means 3A is designed in this case so as to be at a sufficient distance from the inner wall of the bowl 2, in order to sweep the upper exposed surface of the protrusion 10 without bumping into said protrusion 10 on its rotational way, passing locally above the latter.

It is furthermore perfectly conceivable that the appliance 1 comprises a plurality of protrusions 10, preferably identical to each other and preferably arranged at regular intervals inside the bowl 2. For example, the appliance 1 may advantageously comprise two protrusions diametrically opposed to each other relative to the axis X-X', said protrusions being preferably identical to that illustrated in the figures.

Advantageously, the blade 3 also comprises a means 11 for pushing back the food toward the lifting means 3A, under the effect of the relative rotational movement. The means 11 for pushing back the food is thus designed so as to push back the food toward the periphery of the bowl 2, toward the flared section 20 at the level of which the lifting means 3A is positioned. In other words, the means 11 for pushing back the food is configured so as to centrifugally move the food toward the side wall 2B, so as to direct said food toward the lifting means 3A in order for the food in question to be submitted to the lifting action of said lifting means 3A. For that purpose, the means 11 for pushing back the food toward the lifting means 3A preferably comprises a front deflector 11A oriented so as to exert a substantially horizontal thrust effort on the food, i.e. according to a trajectory rotating around the axis X-X', in a plane parallel to the bottom 2A. In order to favor the effect of centrifugal moving of the food, the front deflector 11A has advantageously, in the vertical direction defined by the axis X-X', a height that is sufficient to substantially prevent the food (when present in a small quantity) to pass over it.

Figure 4:
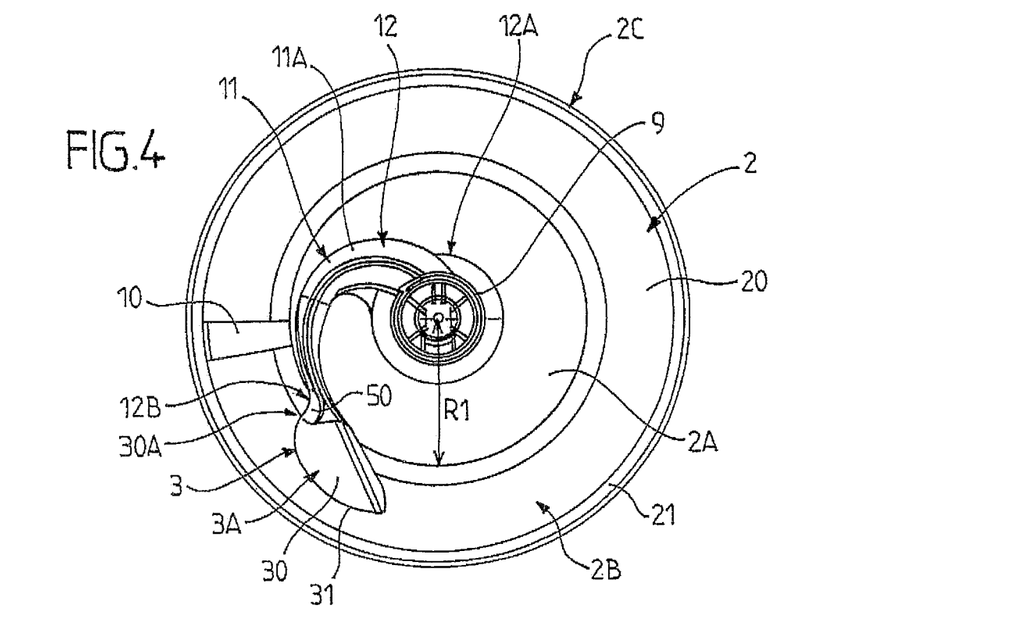
FIG. 4 illustrates, in a top view, the bowl and the blade of FIG. 3.

Preferably, as illustrated in the figures, the projection of the front deflector 11A in a horizontal plane (perpendicular to the axis X-X') has a profile substantially curved rearward relative to the moving direction of the blade 3 with respect to the bowl 2. In other words, the front deflector 11A has a leading edge that is convex, to bring the food toward the periphery of the bowl 2. Preferably, the front deflector 11A has a leading edge that vanishes in the direction of the lifting means 3A, i.e., in the examples illustrated in the figures, a profile vanishing rearward (relative to the rotational direction of the blade 3 with respect to the bowl 2) and the periphery of the bowl 2, for example in a volute shape, as can be seen in particular in FIG. 4. The rearward curvature of the front deflector 11A is thus designed so as, on the one hand, to favor a centrifugal moving of the food along the deflector 11A when the latter, rotated by the bade 3, hurts the food, and on the other hand, to avoid creating a packet of food rotating integral with the blade 3, according to a trajectory substantially purely circular, without concomitant centrifugal movement.

Therefore, the means 11 for pushing back the food toward the lifting means 3A is advantageously located, relative to the moving direction of the blade 3, in front of the lifting means 3A. In other words, the front deflector 11A is located upstream of the lifting means 3A relative to the direction of the food flow colliding the blade 3 (viewed from the latter), during the rotational move of the blade 3, within the food, in the bowl 2.

The food is thus advantageously first submitted to the centrifugal action of the front deflector 11A, which moves the food toward the periphery of the bowl 2 up to the inclined face 30 that lifts the food. The latter then fall over toward the center of the bowl 2, which provides an optimal stirring effect.

Advantageously, the blade 3 comprises a hub 9 as well as at least one first arm 12 extending between a first end 12A integral with the hub 9 and a second end 12B integral with the lifting means 3A. The first arm 12 thus ensures the transmission, to the lifting means 3A, of the rotational movement imparted to the hub 9 by the shaft 7.

Preferably, and as illustrated in the figures, the blade 3 comprises a flap 50 interposed between the first arm 12 and the lifting means 3A, in order to avoid the possible catching, at the junction between the first arm 12 and the lifting means 3A, of food of small size. The flap 50 plays the role of a deflector improving, if necessary, the guiding of the food toward the active part of the lifting means 3A.

Advantageously, the means 11 for pushing back the food toward the lifting means 3A is integral with the first arm 12, and is interposed between said first and second ends 12A, 12B. In this case, the front deflector 11A is advantageously integral with the first arm 12, and extends between said first and second ends 12A, 12B. The second end 12B of the first arm 12 is advantageously arranged toward the periphery of the bottom 2A, so that the first arm 12 overhangs the bottom 2A and can thus sweep the latter. However, the first arm 12 substantially does not extend beyond the bottom 2A, contrary to the lifting means 3A that is connected to the second end 12B, and extends opposite the flared section 20, as exposed hereinabove.

Preferentially, the means 11 for pushing the food back is directly integrated to the first arm 12 and is preferentially integral with the latter, i.e. the first arm 12 is, in this case, configured so as to form itself the front deflector 11A. Advantageously, the blade 3 is in the form of a single-piece part, made for example of plastic, and comprising the hub 9, the volute-shaped first arm 12 being provided at the outer end thereof with an aileron forming the inclined face 30. Advantageously, the surface area of the front deflector 11A decreases from the first end 12A to the second end 12B, i.e. herein the front deflector 11A gets narrower from the hub 9 to the lifting means 3A. This makes it possible, in particular, to concentrate the food toward the lifting means 3A, while favoring the falling over thereof toward the inside of the bowl 2, from said falling-over means 3A.

Generally, the blade 3 is advantageously designed according to the teachings of the document WO-2007/088279, the content of which is incorporated by way of reference.

A specific exemplary embodiment will now be described. In this example, the bowl 2 is designed so as to have a maximum capacity of 600 g of French fries (i.e. the equivalent of about four portions), while being capable of obtaining a good cooking result with a minimum quantity of French fries of about 150 g (i.e. about one portion).

For that purpose, the radius R1 of the disk forming the bottom 2A is substantially equal to 70 mm, whereas the radius of curvature R3 of the flared section 20 is substantially equal to 60 mm, the height H of the side wall 2B being itself substantially equal to 75 mm.

As illustrated in the figures, the profile in an arc of a circle (of radius of curvature R3) of the flared section 20 comes preferably substantially tangent to the horizontal plane at the connection with the bottom 2A, in order to make a progressive connection with the latter. For the same reason, the profile in an arc of a circle of the flared section 20 comes substantially tangent to the vertical direction at the second edge 2B, in order to make a progressive connection with the terminal section 21 of cylindrical shape.

The bowl 2 according to this exemplary embodiment has been used to make three French fry dishes, from raw potato pieces, said dishes being different from each other only by their quantities, which were of 150 g, 300 g and 600 g respectively.

Similar results from the qualitative point of view have been obtained, with this same bowl 2, for each of these three different quantities. The French fries have thus been coated with oil and cooked in a perfectly homogeneous and uniform manner, whatever the quantity (150 g, 300 g or 600 g) introduced in the bowl 2.

The obtaining of this good cooking result, even in the presence of a small quantity of food (herein four times lower than the nominal quantity) is explained by the fact that this small quantity is nevertheless sufficiently great with respect to the surface area of the bottom 2A to be driven, under the action of the blade 3, toward and on the flared section 20, which favors the stirring of the food. Indeed, the presence of the flared section 20 makes it possible for the small quantities to be handled in an accommodation volume that is smaller than the one in which they were with the bowls of the prior art, which allows them to be far more efficiently stirred. In other words, the use of a central planar part (the bottom 2A) surrounded by a curved part (the flared section 20) makes it possible to distribute the small quantities over a smaller surface but over a greater height, which increases the stirring efficiency of the blade.

The invention thus makes it possible, thanks to extremely simple technical measures that consist in particular in simply modifying the geometry of the side wall 2B of the bowl 2, to obtain an appliance 1 providing an excellent cooking result for an extremely wide range of quantities (from the simple to the quadruple for the example described hereinabove), which was impossible to obtain for a bowl of the same nominal capacity but with a side wall only cylindrical as in the prior art.

Of course, the invention is not absolutely limited to a radius of curvature R3 specific of the flared section 20, it being understood that it has however been noted that a radius of curvature R3 at least equal to half the radius R1 of the disk forming the bottom 2A gives very good results.

Therefore, for an appliance 1 that is a dry-cooking fryer of the sort of that described in the document WO-2006/000699, it has been established that good results are obtained when the radius R1 of the disk forming the bottom 2A is comprised between 50 and 150 mm, whereas the radius of curvature R3 is at least equal to 40 mm. The invention has in particular made it possible to highlight the importance of at least two geometrical parameters of the bowl 2 to allow the latter to efficiently handle different quantities of food, i.e.:

the radius R1 of the disk forming the bottom 2A, this radius R1 advantageously corresponding to the approximate distance separating, in the horizontal plane, the first and second ends 12A, 12B of the arm 12 of the blade 3 between which the front deflector 11A extends, and the radius of curvature R3 of the flared section 20 (when the latter has such a radius of curvature, which is not mandatory because it can have for example a shape of a frustum of a cone), said radius of curvature R3 making it possible to adjust, for a given whole diameter of the bowl 2, the minimum quantity of food that the latter can handle in an optimal manner.

Figure 9:
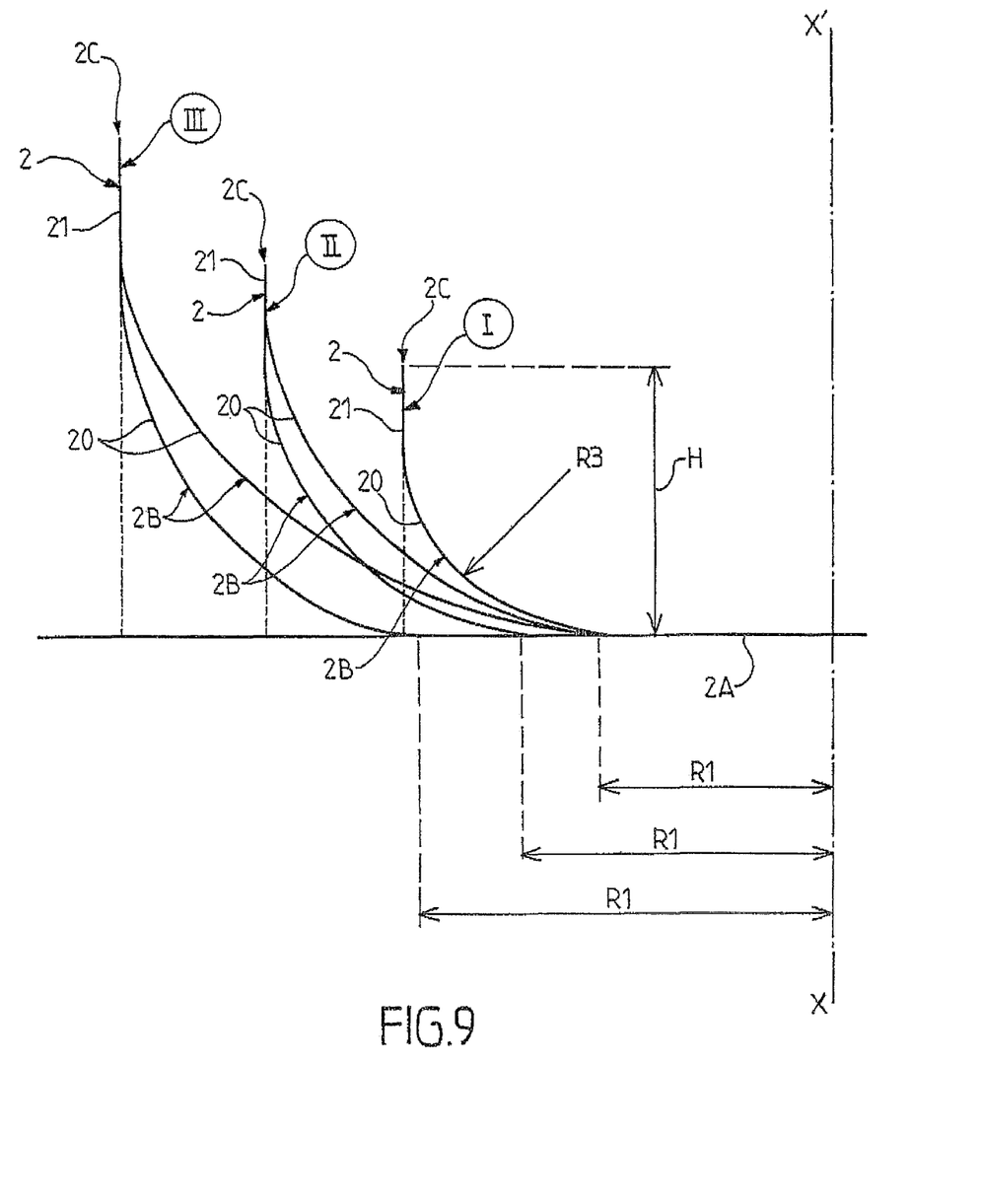
FIG. 9 is a diagram for illustrating the design principle of the bowl of the appliance according to the invention.

FIG. 9 then illustrates different examples of bowls 2 according to the invention. In a first example, Example I, the bowl 2 comprises a bottom 2A of radius R1, a flared section 1 with a radius of curvature R3 that extends from the bottom 2A and that is continued by a cylindrical terminal section 21. This same FIG. 9 shows Example II, that comes in two variants: a first one according to which the flared section 20 extends from the bottom 2A that has a radius R1 identical to that of Example I, and the other according to which the flared section 20 extends from a bottom 2A that has a radius R1 longer than that of the bottom 2A of Example I.

Finally, Example III in FIG. 9 comes itself in two sub-variants: a first one according to which the bottom 2A has a radius R1 identical to that of Example I, and the other according to which the radius R1 of the bottom 2A is far longer than that of Example I.

Playing that way with the size of the bottom 2A and the radius of curvature R3 (or more generally the curvature) of the flared section 20, it is then possible to easily adjust the minimum and maximum quantities of food the appliance 1 could handle with the same cooking efficiency and uniformity.

The invention finds its industrial application in the design, the manufacturing and the use of food cooking appliances.

The invention claimed is:

1. A food cooking appliance comprising a bowl for containing said food and having a side wall, and a blade, said bowl and blade being rotated by a relative rotational movement about an axis of rotation by a driving means in order to stir the food in the bowl, said blade comprising a lifting means configured so as to lift, under the effect of the relative rotational movement, the food with which it enters into contact, and a means for pushing back the food toward the lifting means, under the effect of the relative rotational movement, said appliance wherein said side wall comprises at least one flared section, in that the lifting means extends at least in part plumb with the flared section so as to lift the food that is plumb with the flared section, and in that respective projections of the lifting means and the flared section in a same plane parallel to the axis of rotation overlap each other at least in part, wherein a lower part of the lifting means is capable of interfering with a small quantity of food so as to lift the small quantity of food, whereas an upper part thereof allows higher quantities of food to be handled, wherein said flared section extends from a first edge connected to a bottom of the bowl such that said flared section widens upward from the first edge.

2. The appliance according to claim 1, wherein the lifting means extends plumb with the flared section over one third of the surface thereof facing the bowl.

3. The appliance according to claim 2, wherein the lifting means extends plumb with the flared section.

4. The appliance according to claim 1, wherein the lifting means overhangs above the flared section.

5. The appliance according to claim 1, wherein said flared section extends over the height of the side wall.

6. The appliance according to claim 1, wherein said flared section has a substantially curved shape.

7. The appliance according to claim 6, wherein said flared section has a radius of curvature.

8. The appliance according to claim 1, wherein the bowl comprises a bottom from which the side wall rises, the flared section extending from the bottom, a junction between said bottom and flared section having a substantially regular curvature.

9. The appliance according to claim 1, wherein said side wall also comprises a terminal section substantially cylindrical in shape, which extends from the flared section up to a free edge (2C).

10. The appliance according to claim 1, wherein the bowl comprises a bottom from which the side wall rises, said bottom extending substantially horizontally.

11. The appliance according to claim 1, wherein the bowl comprises a bottom from which the side wall rises, said bottom having substantially a disk shape.

12. The appliance according to claim 7, wherein said radius of curvature is at least equal to half the radius of said disk forming the bottom.

13. The appliance according to claim 12, wherein the radius of said disk is comprised between 50 and 150 mm, whereas said radius of curvature is at least equal to 40 mm.

14. The appliance according to claim 13, wherein the radius of said disk is equal to 70 mm, whereas said radius of curvature is equal to 60 mm and the height of the side wall is equal to 75 mm.

15. The appliance according to claim 1, wherein it comprises a protrusion that protrudes from the side wall toward the inside of the bowl, said protrusion extending at least in part opposite the flared section and being intended to enter into contact with at least a part of the food, so as to prevent the accumulation against the blade of a block of food pieces that substantially do not move with respect to each other.

16. The appliance according to claim 15, wherein said protrusion has an elongated shape and extends over the height of the side wall.

17. The appliance according to claim 1, wherein said lifting means comprises an inclined face configured so that the food slides above it under the effect of the relative rotational movement.

18. The appliance according to claim 17, wherein said inclined face has a surface area that reduces rearward relative to the moving direction of the blade with respect to the bowl, in order to favor the falling over toward the inside of the bowl of the food sliding on and along said inclined face.

19. The appliance according to claim 1, wherein the blade comprises a means for pushing back the food toward the lifting means, under the effect of the relative rotational movement.

20. The appliance according to claim 19, wherein said means for pushing back the food toward the lifting means comprises a front deflector having a leading edge that vanishes in the direction of the lifting means.

21. The appliance according to claim 1, wherein the blade comprises a hub as well as a first arm extending between a first end integral with a hub and a second end integral with the lifting means.

22. The appliance according to claim 1, wherein the front deflector is integral with a first arm and extends between first and second ends.

23. The appliance according to claim 22, wherein a surface area of said front deflector decreases from the first end toward the second end.

24. The appliance according to claim 1, wherein said appliance comprises a main body within which the bowl is fixedly mounted, the blade being rotatably mounted relative to the bowl and to the main body.

25. The appliance according to claim 1, wherein said appliance is a dry-cooking fryer, the bowl and the blade forming means for automatically coating the food with a film of fat by stirring said food with the fat.

* * * * *